H. Y. ARMSTRONG.
GUM BREAKING MACHINE.
APPLICATION FILED NOV. 7, 1908.

954,773.

Patented Apr. 12, 1910.
2 SHEETS—SHEET 1.

Witnesses:

Inventor:
Harry Y. Armstrong
by
Attys.

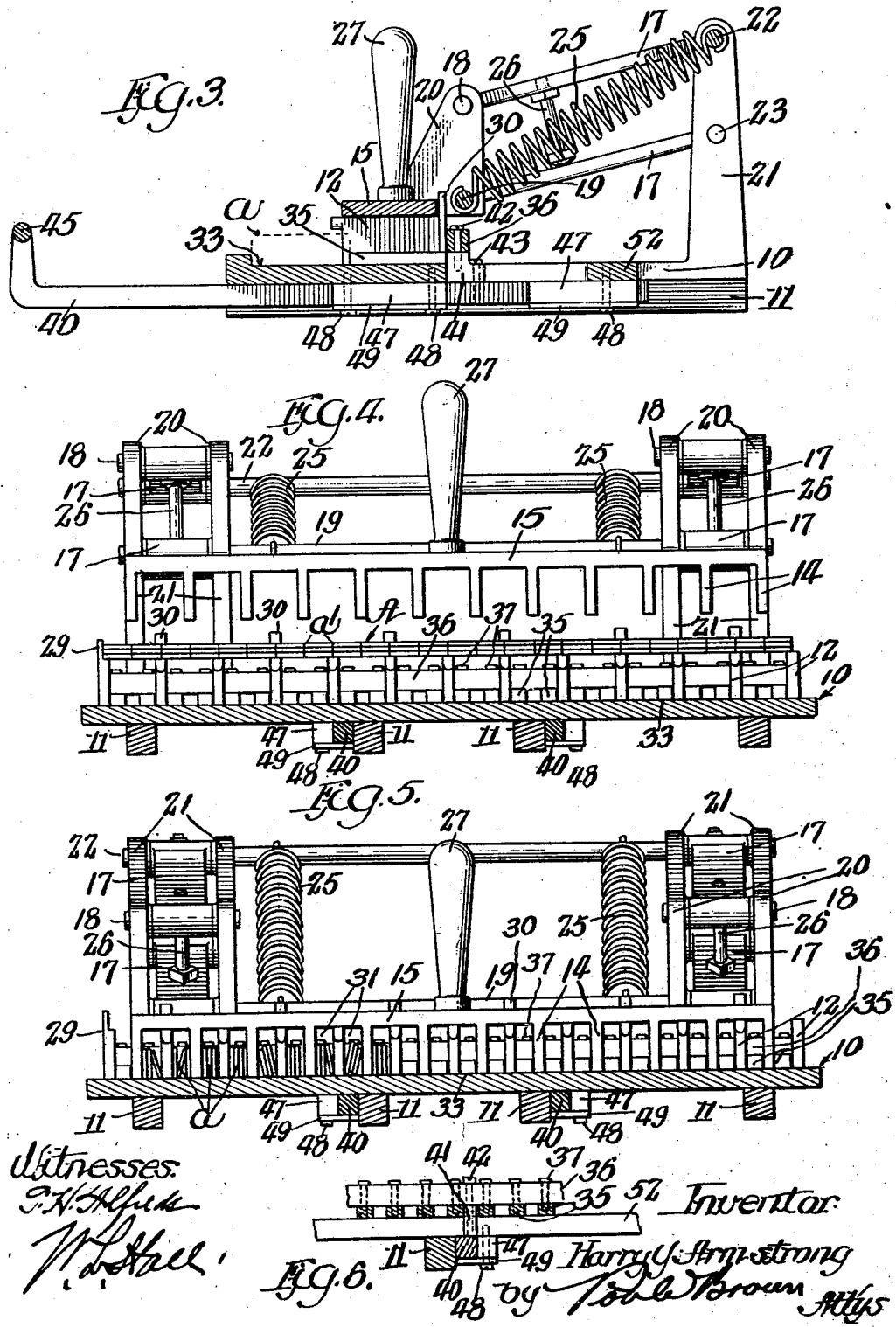

UNITED STATES PATENT OFFICE.

HARRY Y. ARMSTRONG, OF ELGIN, ILLINOIS.

GUM-BREAKING MACHINE.

954,773.  Specification of Letters Patent.  Patented Apr. 12, 1910.

Application filed November 7, 1908. Serial No. 461,577.

*To all whom it may concern:*

Be it known that I, HARRY Y. ARMSTRONG, a citizen of the United States, and a resident of Elgin, in the county of Kane and State of Illinois, have invented certain new and useful Improvements in Gum-Breaking Machines; and I do hereby declare that the following is a full, clear, and exact description thereof, reference being had to the accompanying drawings, and to the characters of reference marked thereon, which form a part of this specification.

This invention relates to a machine for breaking a slab of gum and the like material into individual sticks or cakes, preparatory to wrapping or otherwise disposing of the same, and the invention consists in the matters hereinafter set forth and more particularly pointed out in the appended claims.

The purpose of the invention is to provide a machine wherein scored slabs of gum may be quickly broken into individual sticks ready for wrapping, and so arranged that the sticks of gum are presented in a manner to be readily removed from the machine.

In the manufacture of gum the material is usually rolled to produce large squares or slabs of gum which are scored in criss-cross relation, one set of parallel score lines being located a distance apart equal to the length of the sticks or cakes of gum to be broken therefrom, and the other set of score lines being arranged a distance apart equal to the width of the sticks of gum. This large slab is broken on the first mentioned lines to produce narrower slabs of a width equal to the length of the sticks or cakes, and it is upon the narrower slabs thus produced that my machine operates to produce the individual sticks or cakes in readiness for wrapping.

Figure 1:
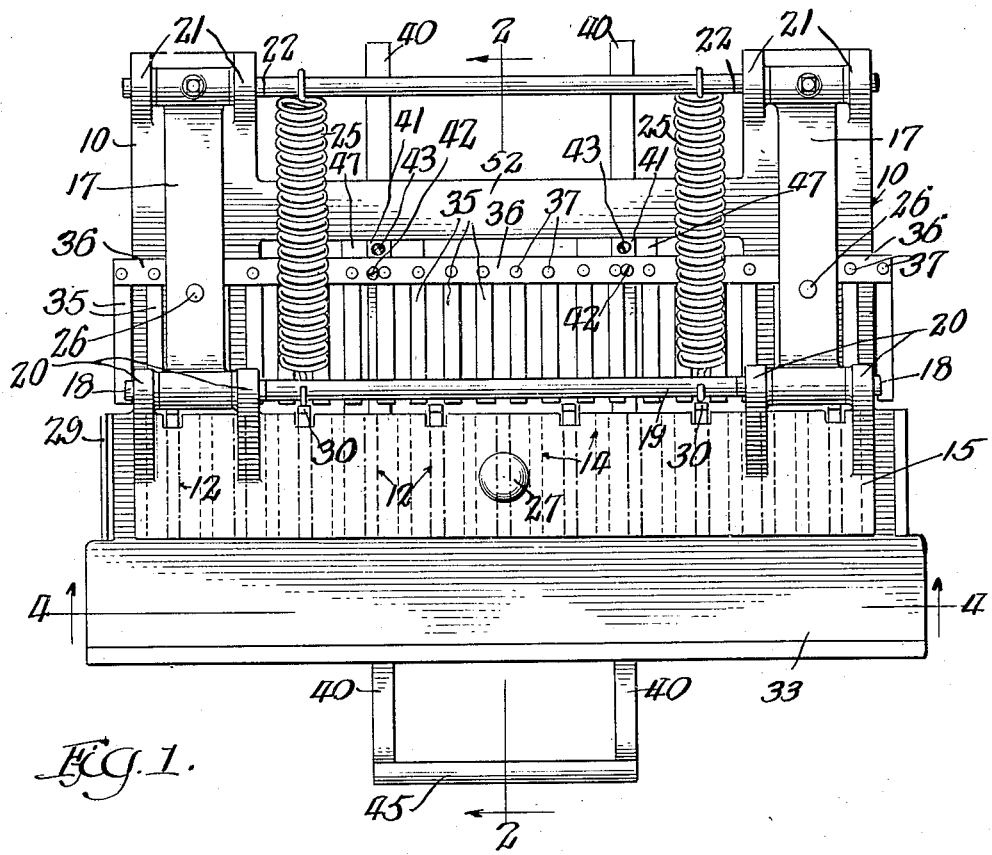
Figure 2:
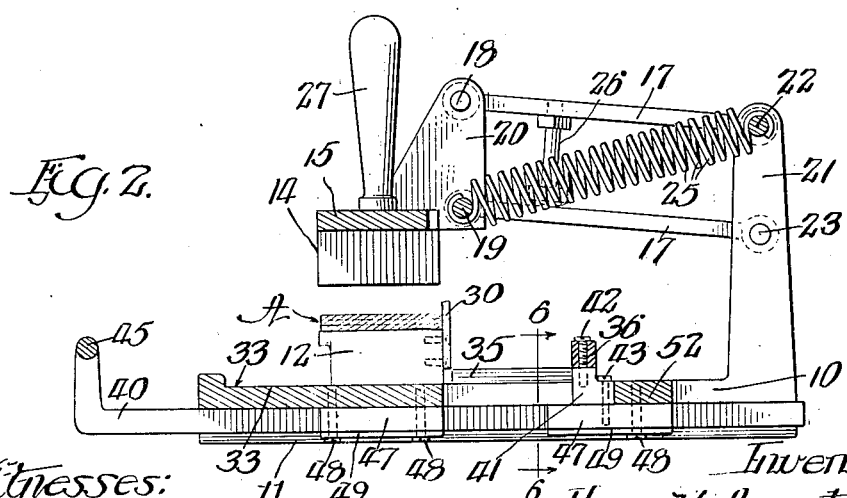

As shown in the drawings:—Figure 1 is a plan view of a machine embodying my invention. Fig. 2 is a transverse section on the line 2—2 of Fig. 1. Fig. 3 is a view similar to Fig. 2, with parts thereof shown in changed positions. Fig. 4 is a longitudinal section taken on line 4—4 of Fig. 1. Fig. 5 is a view similar to Fig. 4 with parts thereof in changed positions. Fig. 6 is a detail of the ejecting mechanism taken on line 6—6 of Fig. 2.

As shown in the drawings, 10 designates the base-plate of the machine frame, and 11, 11 a plurality of bars or ribs beneath the same, through the medium of which the machine may be sustained from a suitable horizontal support.

12, 12 designate a plurality of lower parallel, breaking bars arranged on edge near the front of the base and extending from front to rear thereof, which constitute a support for slabs A of gum (Figs. 2 and 4) preparatory to breaking the slabs into sticks *a* (Fig. 5).

14, 14 designate an upper set of breaking bars, the bars of which are arranged parallel to and out of line with the bars of the lower set 12. The upper set of breaking bars, as herein shown, are movable toward and from the lower set. Said upper breaking bars are arranged one midway between each two adjacent bars of the lower set. The upper breaking bars 14 are carried by a vertically movable frame plate 15. The said lower and upper sets of breaking bars may be made integral with the base plate 10 and the frame plate 15, and are herein shown as thus arranged.

The upper set of breaking bars are carried by and mounted on the forward ends of two pairs of levers 17, 17, the levers of each pair being parallel and arranged one above the other, with one pair located at each end of the machine. Said levers are pivotally connected at their forward ends to the upper breaking bar frame through the medium of upper and lower horizontal rods 18, 19 extending between laterally separated lugs 20 rising from the ends of the frame plate 15. The levers are pivotally connected at their rear ends to the standards 21, 21 rising from the rear side of the base at the ends thereof through the medium of upper and lower horizontal rods 22, 23 mounted in the upper ends of said standards. The said standards 21 are herein shown as divided to receive between them the rear ends of said levers 17. The pivot rods 22 and 19 extend continuously from one standard to the other for a purpose hereinafter to be described. The parallel arrangement of the levers 17, 17, which carry the upper set of breaking bars and the frame plate 15 give to said upper breaking bars vertical movement toward and from the lower set of breaking bars, thereby maintaining the breaking edges of the two sets of bars at all times parallel with each other. The movable set of breaking bars are thus made to strike the slabs of gum squarely in their descent and avoid derangement of said slabs on their support.

Spiral springs 25, 25 extend between and are attached to the upper rear pivot rod 22 and the lower forward pivot rod 19 and are disposed obliquely to the parallel levers and serve to hold the upper breaking bar frame plate in any position in its vertical movement at which it may be placed. Stop pins 26, 26 are arranged between the two levers 17, 17 of each pair one at each end of the machine to limit the upward swinging movement of said levers and the upward movement of the movable set of breaking bars. Said stop pins 26 are herein shown as having screw-threaded connection with the upper levers of each pair and extend toward the other lever, and are adapted to engage at their lower ends the upper faces of the lower levers, as the forward ends of said levers are swung upwardly, to arrest the upward movement of the upper breaking bars, as shown in Fig. 2. A handle 27 extends upwardly from the upper breaking bar frame for the purpose of manipulating the movable breaking bars.

In the operation of the machine thus far described, the slabs A of gum are placed on the upper edges of the lower set of breaking bars, by which they are supported in the manner shown in Figs. 2 and 4, at a time when the upper set of breaking bars is in its upper position. The said lower breaking bars are provided with gage lugs 29, 30 which extend above the supporting faces of the lower breaking bars and by which the slabs are gaged to proper position. When the said slabs are so arranged on the lower breaking bars the score or breaking lines $a^1$ of the slabs are located with each alternate score line of each slab in line with the lower breaking bars and with the other score lines in line with the upper breaking bars, as clearly shown in Fig. 4. The upper breaking bars are now depressed by grasping the handle 27 and in the descent of the upper bars the lower edges thereof strike the scored parts of the sections of the slabs that are bridged across adjacent lower breaking bars and said slabs are broken into the individual sticks $a$. The bars of said upper set are depressed until the lower edges thereof are engaged with and arrested by the base plate between the bars of the lower set. The individual sticks thus broken from the slabs fall edgewise, as shown in Fig. 5, into the spaces 31 between the lower and upper sets of breaking bars. It will be noted that the number of individual sticks in each group in a space 31 is equal to the number of superposed slabs A placed on the lower breaking bar. As herein shown, three slabs are supported on the lower breaking bars preparatory to breaking, and the groups of sticks $a$ comprise three sticks in each group. The breaking edges of said bars are blunt or squared in order to avoid cutting or chipping the sticks of gum broken from the slabs, and to insure that the sticks will be broken off squarely along the scored lines. By reason of the fact that the lower edges of the upper breaking bars are depressed entirely to the level of the lower edges of the lower breaking bars, or to the frame plate 10 in the construction shown, the sticks of gum are prevented from sliding laterally beneath the upper bars in a manner to derange the grouped relation of said sticks.

Means are provided whereby the groups of sticks of gum that are broken down into the spaces between the lower breaking bars may be delivered in their grouped relation from said spaces 31 so as to be readily removed from the breaking mechanism in an orderly manner. Various means may be employed for this purpose. As herein shown said sticks are ejected forwardly from said spaces by a suitable ejecting device, upon a receiving table 33 located in front of the breaking bars. Said ejecting device is made as follows: 35, 35 indicate a plurality of short, horizontal ejector fingers arranged each in line with one of the spaces 31. Said fingers are attached to a horizontal connecting member 36 arranged longitudinally of the machine in the rear of the breaking bars and movable from front to rear of the machine. As herein shown, said ejector fingers are attached to the under side of the connecting member by means of screw-bolts 37. The said ejector fingers and connecting member 37 are moved forwardly and rearwardly through the medium of forwardly and rearwardly sliding, parallel actuating bars 40, 40 which are attached to said connecting member 36 through the medium of blocks 41, 41, said blocks being attached to the connecting members by screws 42 and to said actuating bars 40 by other screws 43. Said actuating bars 40 are connected together at their forward ends by a hand piece 45, by which they are moved forwardly and rearwardly. The actuating bars 40 are guided between two adjacent supporting bars 11 and guide blocks 47, 47 arranged at the sides thereof and attached to the under side of the frame piece by screws 48, 48. The said screws 48, 48 also extend through and attach to said block gibs 49, between which latter and the bottom side of the base plate the actuating bars 40 are confined.

In Figs. 1 and 2 the ejector fingers are shown in their rearmost position, which position they occupy when the slabs of gum are placed upon the lowermost set of bars and during the descent of the upper breaking bars to break the individual sticks from said slabs of gum. After the sticks have been broken from the slabs and the parts are in the position shown in Fig. 5, the said ejector fingers are moved forwardly, by grasping the handle 45 of the ejector finger actuating bars, to the position shown in Fig. 3, thereby ejecting or forcing the sticks of gum upon the receiving table 33, as indicated in dotted lines in Fig. 3. In this position the sticks of gum may be readily removed from the receiving table, after which the ejector bars are returned and the upper set of breaking bars are swung upwardly to permit another group of gum slabs to be placed on the lower set of breaking bars preparatory to breaking said slabs. It will be observed by reference to Fig. 3 that the ejecting movement of the fingers 35 do not clear the rear ends of the sticks of gum from the forward ends of the breaking bars, thereby providing means for supporting the sticks in grouped relation to permit them to be removed from the breaking means as groups. The forward movement of the ejector fingers is arrested by contact of the connecting member 36 with the rear ends of the lower breaker bars or the gage lugs attached thereto, and that the rearward movement of said fingers is arrested by contact of the blocks 41 with a cross member 52 of the base of the machine.

By the use of the machine herein shown, a slab or group of gum slabs may be quickly broken into individual sticks and the sticks grouped for easy and ready subsequent handling.

The machine is exceedingly simple yet strong and durable in its construction and inexpensive to manufacture and has a small number of operative parts with small likelihood of derangement in use.

The embodiment of the invention disclosed in the machine herein shown is a simple and practical form, but it will be understood that the invention may assume structurally different forms within the scope of the claims hereto appended, and I do not limit myself to the details shown, except as to those claims wherein such details are specifically claimed.

I claim as my invention:

1. In a gum breaking machine, means for horizontally supporting a plurality of superposed scored gum slabs, and means for breaking said scored slabs into individual sticks and constructed to arrange said sticks vertically on edge in a plurality of groups.

2. A gum breaking machine comprising upper and lower sets of parallel, spaced breaking bars movable one toward and from the other to bring the bars of one set between those of the other set, the bars of one set being spaced out of line with the bars of the other set, means movable into the spaces laterally between the upper and lower bars for ejecting the sticks of gum from the spaces between the bars, and a receiving table in front of the breaking bars upon which the sticks of gum are delivered by the ejecting means.

3. A gum breaking machine comprising a lower set of spaced breaking bars arranged to support on their upper edges a slab or slabs of gum and an upper set of breaking bars, the bars of which are parallel with and out of line with the bars of the lower set and movable downwardly into the spaces between the bars of the lower set, the opposed or breaking edges of said bars being blunt, and means for giving movement to the upper bars, constructed to maintain the breaking edges thereof parallel.

4. A gum breaking machine comprising a plurality of spaced, upright breaking bars arranged to support on the upper edges thereof a slab or slabs of gum, an upper set of breaking bars, the bars of which are arranged parallel to and out of line with the bars of the lower set, a frame carrying the upper set of breaking bars, and upper and lower parallel swinging levers at each end of the machine pivoted at their forward ends to and carrying said upper breaking bar frame and pivoted at their rear ends to the machine frame.

5. A gum breaking machine comprising a plurality of spaced, upright breaking bars arranged to support on the upper edges thereof a slab or slabs of gum, an upper set of breaking bars the bars of which are parallel to and out of line with the bars of the lower set, a frame carrying the upper set of breaking bars, swinging levers pivoted to said upper breaking bar frame and to the machine frame and arranged to give vertical movement to said upper breaking bar frame, and means acting to hold said upper breaking bar frame restrained at any point in its path of movement.

6. A gum breaking machine comprising a plurality of spaced, upright breaking bars arranged to support on the upper edges thereof a slab or slabs of gum, an upper set of breaking bars, the bars of which are arranged parallel to and out of line with the bars of the lower set, a frame carrying the upper set of breaking bars, swinging levers pivoted to said upper breaking bar frame and to the machine frame and arranged to give vertical movement to said upper breaking bars, and counterbalancing springs extending between the machine frame and the movable upper breaking bar frame for the purpose set forth.

7. A gum breaking machine comprising a base, a plurality of upright, spaced breaking bars at the front of said base, an upper set of breaking bars arranged above the lower set, with the bars thereof parallel to and out of line with the bars of the lower set, a frame carrying said upper set, a pair of parallel levers at each end of the machine, the levers of each pair being pivoted at their front ends to the upper breaking bar frame at vertically separated points and at their rear ends to standards rising from the base at vertically separated points, and a spring arranged obliquely to the upper and lower levers of each pair and extending from one of the pivots at the front end of the levers to another of the pivots at the rear ends of the levers.

8. A gum breaking machine comprising a lower set of spaced, vertical breaking bars arranged to support on their upper edges a slab or slabs of gum, gage lugs rising above said lower breaking bars to position the gum slabs thereon, and an upper set of breaking bars, the bars of which are out of line with and parallel to the bars of the lower set, and adapted to be moved into the spaces between the bars of the lower set.

9. In a gum breaking machine, means for supporting a plurality of superposed scored gum slabs, means for breaking said scored slabs into individual sticks and arranging said sticks in groups on edge perpendicular to the planes occupied by the slabs, and means for ejecting the several groups from the breaking means.

10. A gum breaking machine comprising a plurality of spaced, upright breaking bars arranged to support on the upper edges thereof a slab or slabs of gum, an upright set of breaking bars, the bars of which are arranged parallel to and out of line with the bars of the lower set, a spring carrying the upper set of breaking bars, upper and lower parallel swinging levers at each end of the machine pivoted at their forward ends to and carrying said upper breaking bar frame and pivoted at their rear ends to the machine frame, and stops, one carried by one of the levers of each pair, each arranged for engagement with the companion member to limit the upwardly swinging movement of said levers.

In testimony, that I claim the foregoing as my invention I affix my signature in the presence of two witnesses, this 21st day of October A. D. 1908.

HARRY Y. ARMSTRONG.

Witnesses:
WILLIAM L. HALL,
T. H. ALFREDS.